Aug. 30, 1966  C. B. HOOD, JR  3,269,137
DENSE GAS HELIUM REFRIGERATOR
Filed Dec. 18, 1964  8 Sheets-Sheet 1

INVENTOR.
CHARLES B. HOOD JR
BY
Schmieding & Sultz
ATTORNEYS

Aug. 30, 1966 C. B. HOOD, JR 3,269,137
DENSE GAS HELIUM REFRIGERATOR
Filed Dec. 18, 1964 8 Sheets-Sheet 2

INVENTOR.
CHARLES B. HOOD JR.
BY Schmieding & Fults
Attorneys

INVENTOR.
CHARLES B. HOOD JR

BY Schmieding ＆ Fultz
Attorneys

INVENTOR.
CHARLES B. HOOD JR.
BY
ATTORNEYS

INVENTOR.
CHARLES B. HOOD JR

BY Schmieding & Suetz

ATTORNEYS

Aug. 30, 1966  C. B. HOOD, JR  3,269,137
DENSE GAS HELIUM REFRIGERATOR
Filed Dec. 18, 1964  8 Sheets-Sheet 6

INVENTOR.
CHARLES B. HOOD JR.

United States Patent Office 3,269,137
Patented August 30, 1966

3,269,137
DENSE GAS HELIUM REFRIGERATOR
Charles B. Hood, Jr., Columbus, Ohio, assignor to Cryo-Vac, Inc., Columbus, Ohio, a corporation of Ohio
Filed Dec. 18, 1964, Ser. No. 419,408
14 Claims. (Cl. 62—127)

This invention relates to dense gas helium refrigerators.

In general, the helium refrigerator of the present invention is uniquely compact for its output due to a novel arrangement of warm and cold heat exchangers each in a respective vertically disposed open-mouthed Dewar. These Dewars, as well as the helium gas supply and the other components of the refrigerator, are mounted on a common base of a refrigerator frame which is skid mounted so as to be moveable to various locations for refrigerating different thermal shrouds or other apparatus to be cooled.

The refrigerator of the present invention acheives compactness by this unique use of two relatively low Dewars and two vertically disposed Dewars and vertically disposed heat exchangers, each in a respective Dewar. This is in effect cutting in half one high Dewar and one heat exchanger whereby the overall heat of the refrigerator is subsequently cut in half.

The refrigerator is further unique in that both the warmer and colder heat exchangers are each suspended from a respective Dewar lid with its warm end at the top and its cold end at the bottom. This arrangement permits filling the Dewars and surrounding the heat exchangers with non-circulating stratified gas that stratifies with hot gas at the top end, cold gas or liquids at the bottom. This corresponds with the thermal gradients of the heat exchangers thereby preventing the undesirable circulation of the gaseous medium within the Dewars.

As another aspect of the present invention, the above-mentioned Dewar and heat exchanger arrangement permits the maintenance of a bath of liquid nitrogen in the bottom of the Dewar containing the warmer heat exchanger with the result that the outlet flow from the warm heat exchanger, which is at the bottom of the exchanger and above the liquid nitrogen bath, can be passed directly through a gas purifier disposed in the bath and thence in heat exchange relationship with the liquid nitrogen bath before being delivered to the colder heat exchanger. This arrangement provides a uniquely highly efficient temperature differential in the order of approximately 2 degrees Kelvin at the warm end of the low temperature heat exchanger which is a relatively small temperature differential as compared to a difference of approximately 10 degrees Kelvin between the paths at the low temperature end of of the warm heat exchanger.

The difference between the 10 degree temperature difference at the cold ends of the paths of the warm heat exchanger and the 2 degree temperature difference at the warm end of the paths of the cold heat exchanger is absorbed by the previously mentioned evaporating liquid nitrogen bath surrounding the gas purifier through which is passed the flow between the two exchangers. This results in a relatively small temperature differential for any given physical dimensions of the heat exchanger means.

As another advantage of the present invention compactness of size results from feeding the warm end of the warm heat exchanger with a compressor provided with a suction pressure regulating apparatus that eliminates the need for large supply gas holders.

As another advantage of the present invention the refrigerator is provided with a rapid cool-down apparatus which greatly reduces the time required to cool-down the refrigerator itself and the load. This is accomplished in two hours as compared with many hours or days, the latter being the required time without the rapid cool-down feature.

As another advantage the refrigerator of the present invention includes an automatic temperature controller which operates at cryogenic temperatures and which accurately regulates the temperature of the refrigerant leaving the load and entering the cold heat exchanger.

As still another advantage of the present invention the refrigerator includes an adsorption type gas purifier located in the flow between the warm and cold heat exchangers which serves to remove gaseous impurities such as oxygen, nitrogen, and carbon dioxide which would otherwise freeze-out in colder portions of the refrigeration cycle.

It is, therefore, an object of the present invention to provide a dense gas helium refrigerator that is highly efficient yet extremely compact for its capacity.

It is another object of the present invention to provide a refrigerator of the type described that utilizes a novel suction pressure regulator apparatus at the intake side of the compressor whereby large gas holders are eliminated.

It is another object of the present invention to provide a refrigerator of the type described that includes a rapid cool-down apparatus whereby the load in the refrigerator itself can be brought down to operating temperatures in a minimum of time.

It is another object of the present invention to provide a refrigerator of the type described that includes an automatic temperature controller that permits the setting of various desired temperatures for the return flow of refrigerant whereby the small critical temperature difference at the cold ends of the paths of the low temperature heat exchanger can be precisely maintained at various desired temperature values.

Further objects and advantages of the present invention will be apparent from the following description, reference being had to the accompanying drawings wherein a preferred form of embodiment of the invention is clearly shown.

Figure 1:
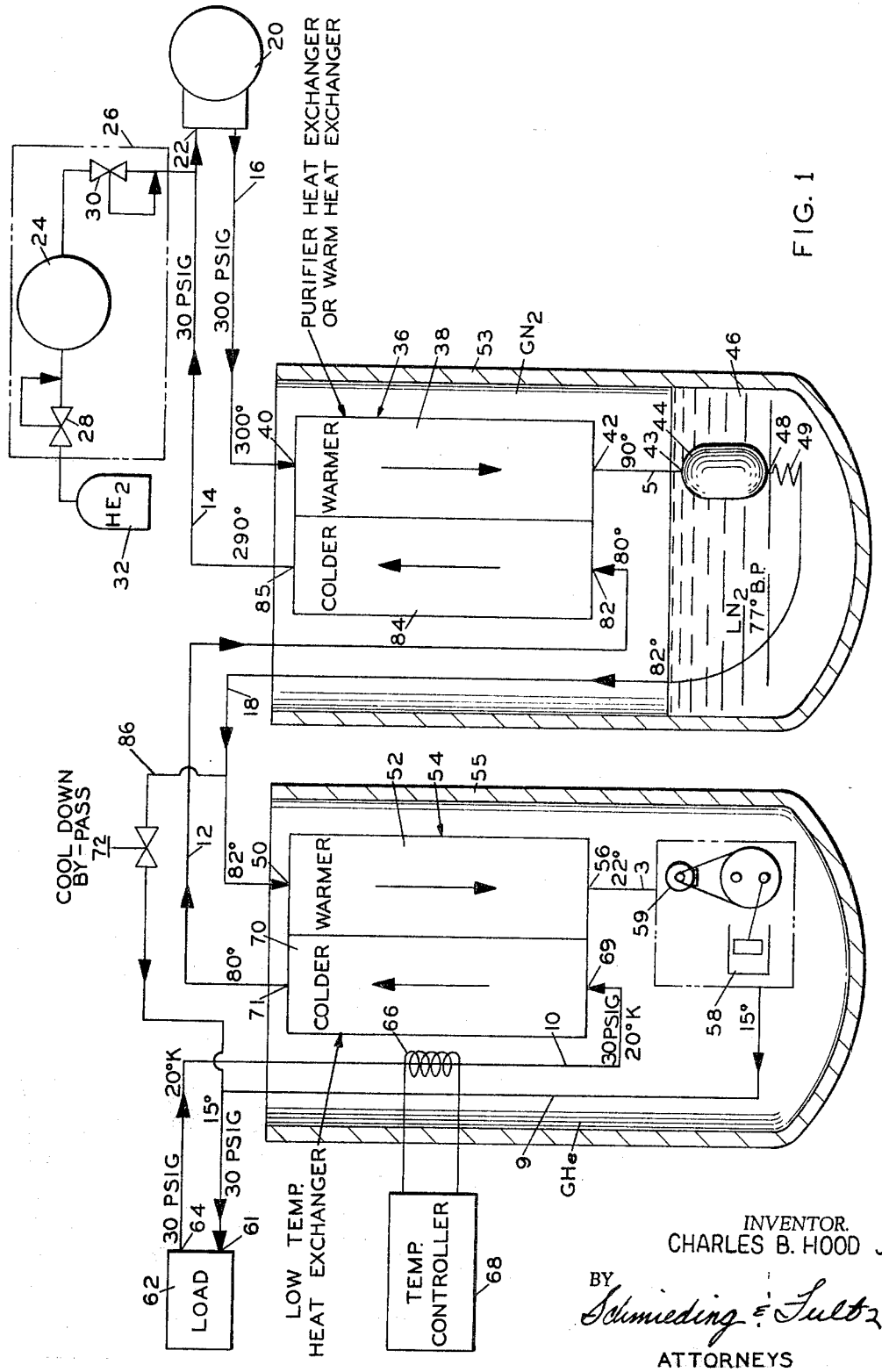
FIG. 1 is a diagrammatic view of a dense gas helium refrigerator constructed in accordance with the present invention.

Referring in detail to the drawings, FIG. 1 illustrates a cryogenic refrigerator that includes a compressor 20 having an inlet 22 connected to a tank 24 of a suction pressure regulating apparatus indicated generally at 26. The pressure regulating system 26 includes a valve 28 for maintaining a constant pressure, for example, 50 p.s.i. in tank 24, and valve 30 for maintaining a constant pressure, for example, 30 p.s.i. at the inlet of the compressor.

A gaseous helium supply means is diagrammatically illustrated at 32 and serves to supply the helium gas refrigerant to tank 24 via valve 28.

The outlet of compressor 20 is connected by a conduit 16 to warm heat exchanger indicated generally at 36 and the flow therein enters a warmer path 38 at an inlet 40 and is released from an outlet 42 to the inlet 43 of an adsorption type gas purifier 44 that contains an adsorptive substance such as silica gel, charcoal, or the like.

The purpose of purifier 44 is to freeze-out gaseous impurities such as oxygen, nitrogen, or carbon dioxide which would otherwise freeze-out in colder portions of the cycle.

It should be pointed out that purifier 44 is immersed in an evaporating bath 46 of liquid nitrogen having a boiling point temperature of 77 degrees Kelvin.

The outlet 48 of purifier 44 is connected to a liquid nitrogen heat exchanger 49, in the form of coiled tubing, which is in turn connected by a conduit 18 to an inlet 50 of a warmer path 52 of a cold heat exchanger indicated generally at 54 and outlet 56 of this heat exchanger delivers the refrigerant to the inlet of an engine 58.

It should be pointed out that the warm heat exchanger and low temperature heat exchanger are each disposed in a respective Dewar 53 and 55.

The expansion engine works against an external load applied by a synchronous motor, or other suitable means, located outside the Dewar and diagrammatically illustrated at 59.

The outlet of the engine is in turn connected to the inlet of a load 62.

After the gaseous refrigerant passes through the load it leaves the outlet 64 via a conduit 10 and thence passes through a heating element 66 of a flow temperature controller 68. Controllers of this type include a sensing means that automatically varies a variable voltage transformer to increase or decrease the heating effect applied to the gaseous flow via heating element 66 as may be required to maintain a constant temperature, for example 20 degrees Kelvin, at an inlet 69 of a cooler path 70 through cold heat exchanger 54.

After the flow leaves outlet 71 of colder path 70 of cold exchanger 54 via conduit 12 it enters an inlet 82 of a colder path 84 of warm heat exchanger 36 and upon leaving outlet 85 of warm heat exchanger 36 it is returned via a conduit 14 to the inlet of compressor 20.

For purposes of rapid cool-down a bypass conduit 86 is connected between the outlet of purifier 44 and the inlet 61 of the load and a shut-off valve 72 is provided for controlling the cool-down operation.

In operation, gaseous helium from a pressurized supply 32 passes through suction pressure regulating apparatus 26 wherein pressure regulating valve 28 maintains tank 24 at 50 p.s.i. and pressure control valve 30 maintains a line pressure of 30 p.s.i. at the inlet 22 of compressor 20.

The refrigerant leaves the compressor at 300 p.s.i. and 300 degrees Kelvin and is cooled-down to 90 degrees Kelvin in warmer paths 38 of warm heat exchanger 36.

In passing through purifier 44 the previously mentioned impurities are frozen-out and the gas leaves the evaporating bath 46 of liquid nitrogen at approximately 82 degrees Kelvin.

In flowing through the warmer path of the low temperature heat exchanger the temperature drops to 22 degrees Kelvin and then to 15 degrees Kelvin in passing through expansion engine 58.

In passing through the load 62 the refrigerant absorbs 5 degrees and is raised to 20 degrees Kelvin or to other temperature values slightly above or below 20 degrees Kelvin. Before the flow is returned to the cooler path 70 of the cold heat exchanger it is precisely controlled by temperature controller 68 so that it enters the cooler path at 20 degrees Kelvin to provide an exact temperature difference at the cold end of the low temperature exchanger.

It should be pointed out that the temperature difference at the cold end of the low temperature heat exchanger is critical since in taking heat out of the load 62 temperature difference is relatively small; i.e., 5 degrees Kelvin. It should, therefore, be understood that if even one degree is lost in the temperature difference at the cold end of the low temperature heat exchanger; say, a temperature rise from 2 degrees to 3 degrees Kelvin, then there is a resulting loss of 20 percent in the total output efficiency of the refrigerator.

The gas from the cold end of the low temperature heat exchanger is warmed in the return flow through the warm heat exchanger and thence delivered back to the suction side of the compressor to complete the cycle.

For purposes of rapid cool down, at the outset of operation, valve 72 is opened whereby cold helium gas from the outlet of purifier 44 is released directly into load 62 via line 86. When the load cools the cold gas goes back to the low temperature heat exchanger thereby cooling low temperature heat exchanger 54 and also expansion engine 58, said expansion engine being in heat exchange relationship with the low temperature heat exchanger.

Reference is next made to FIGS. 2 through 5 which illustrate the actual refrigerator mechanism which includes a frame indicated generally at 100. The frame comprises vertical frame members 102, horizontal frame members 104 and 106 and skid members 108, the latter serving to facilitate moving the refrigerator to various loads to be refrigerated.

Figure 2:
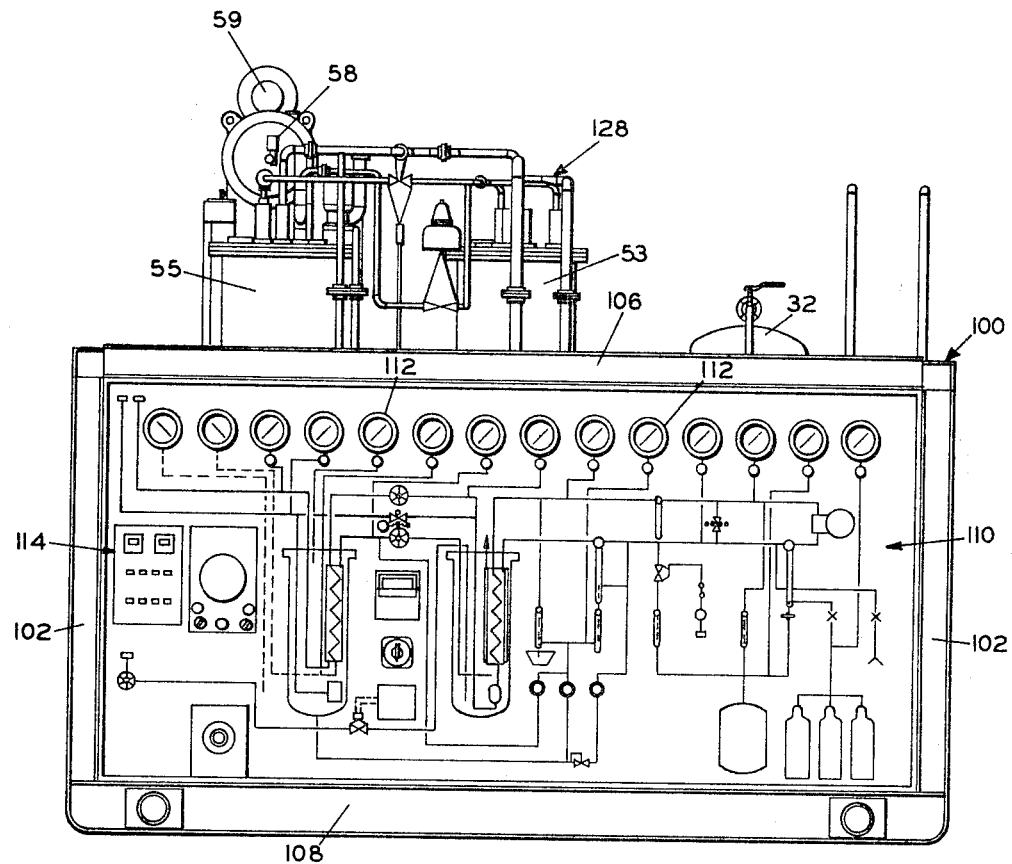
FIG. 2 is a front elevational view of the helium refrigerator of the present invention.
Figure 3:
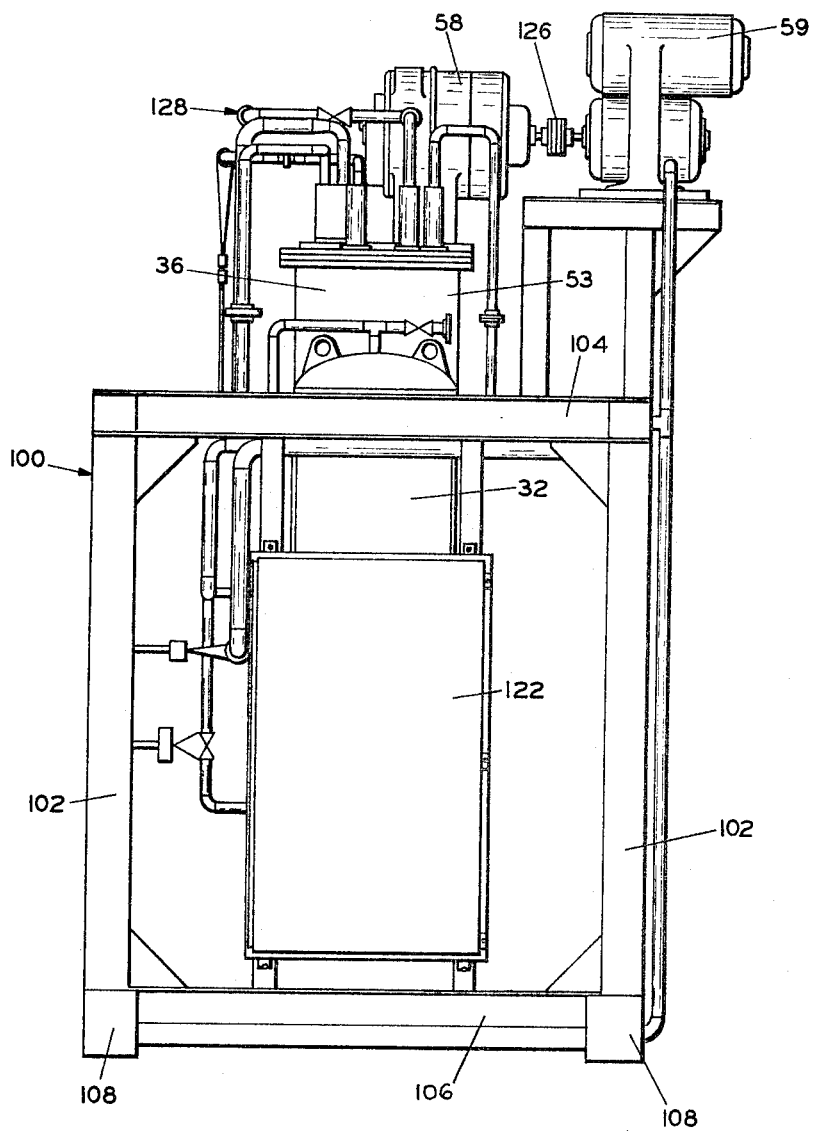
FIG. 3 is a right side elevational view of the helium refrigerator of the present invention.
Figure 4:
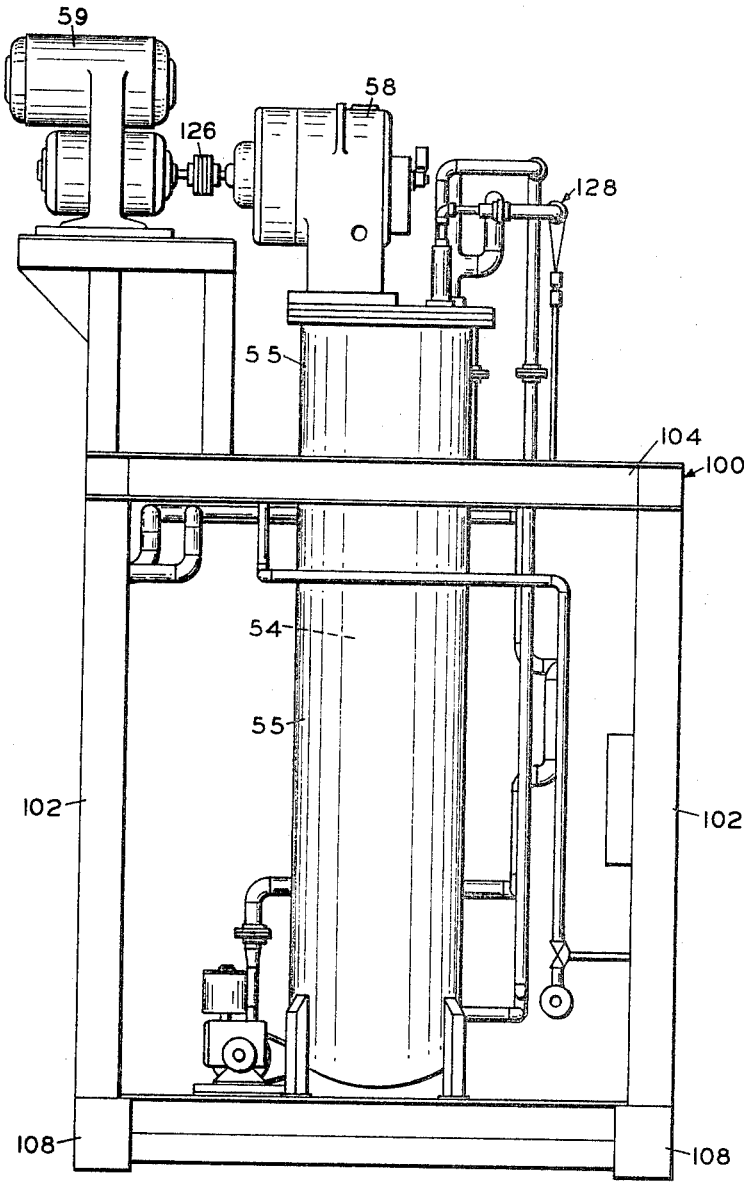
FIG. 4 is a left side elevational view of the helium refrigerator of the present invention.
Figure 5:
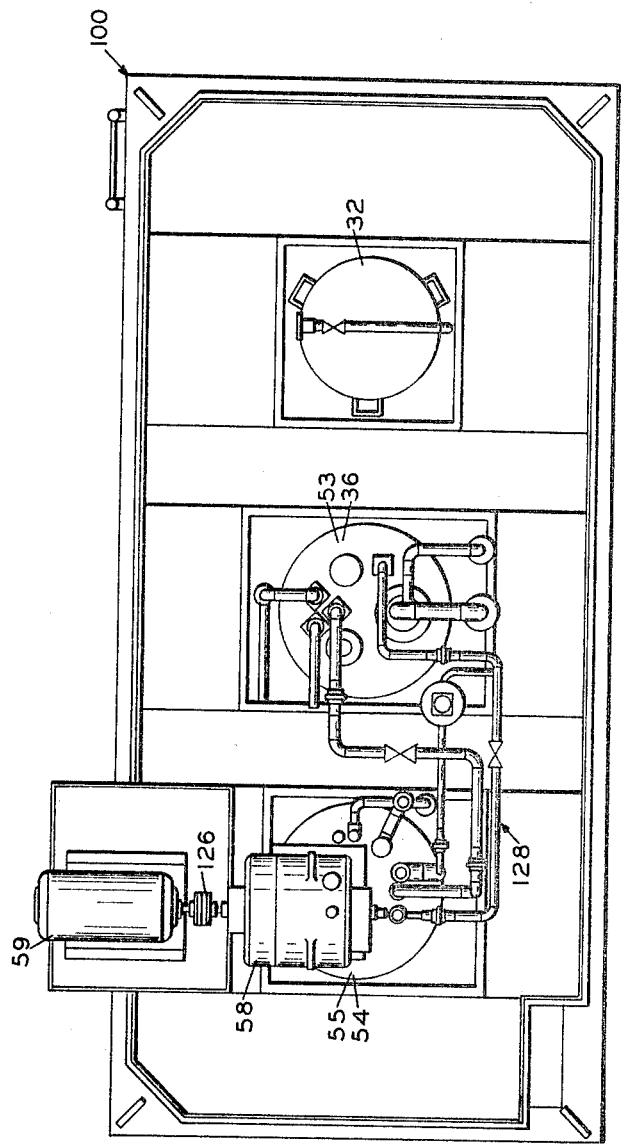
FIG. 5 is a top view of the helium refrigerator of the present invention.

As seen in FIG. 2, the front of the refrigerator comprises a large size graphic control panel indicated generally at 110 which diagrammatically illustrates the refrigeration cycle in essentially the same detail as the previously described diagrammatic view of FIG. 1. In addition, a plurality of pressure gauges 112 are mounted on graphic control panel 110 and serve to show pressures at the various points in the flow system.

It will also be seen that the front panel includes a control station indicated generally at 114.

With continued reference to FIGS. 2 through 5, frame means 100 supports the previously mentioned warmer Dewar 53, colder Dewar 55, gaseous helium storage tank 32, and an electrical control cabinet 122.

Figure 8:
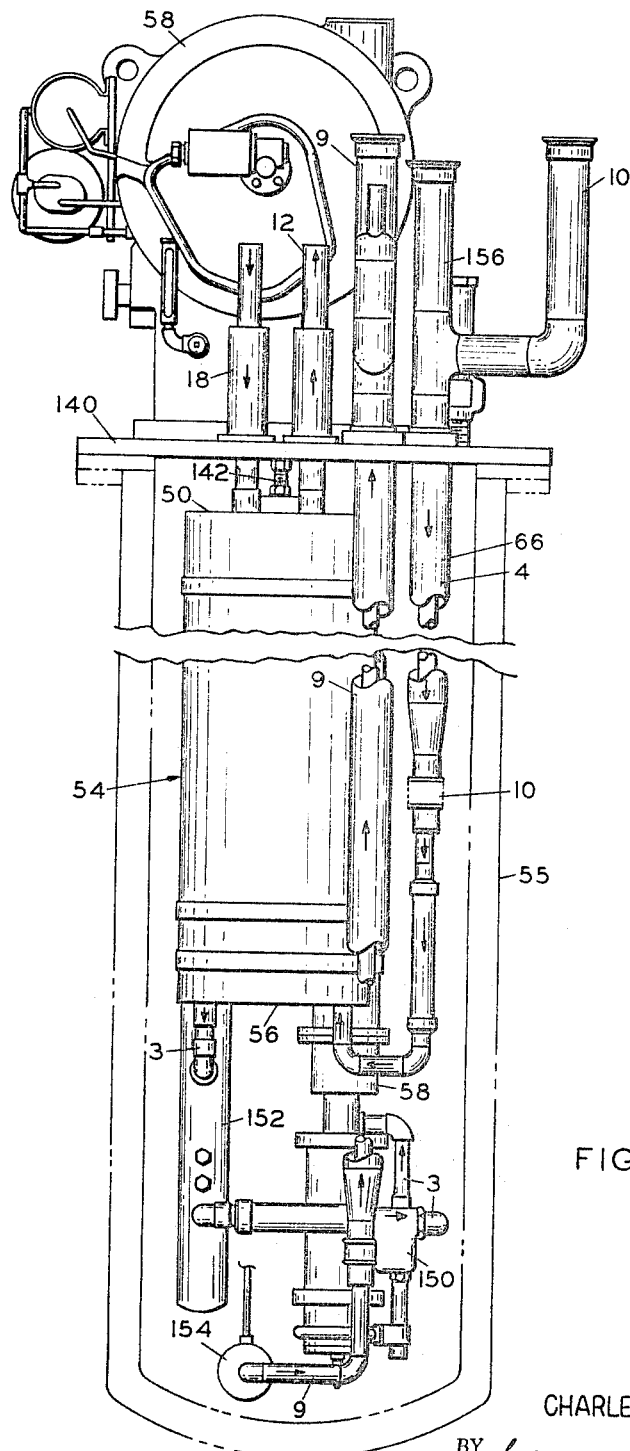
FIG. 8 is a front view, partially in section, of a colder Dewar and colder heat exchanger comprising a portion of the apparatus of the preceding figures.

The previously mentioned expansion engine 58 is mounted on top of colder Dewar 55 and includes a portion extended through the rear end into the interior of the Dewar as is seen at 58 in FIG. 8.

Adjacent the expansion engine end of the frame means is mounted a variable speed drive 59. This mechanism serves the dual function of starting the expansion engine and providing a brake for a load during operation of the expansion engine. It will be noted that variable speed drive 59 is connected to expansion engine 58 at a flexible coupling 126.

At this point it should be pointed out that the piping system indicated generally at 128 in FIGS. 1 through 5 is merely representative of a piping system and not complete since the piping system is shown in detail in the diagrammatic view of FIG. 1.

Figure 6:
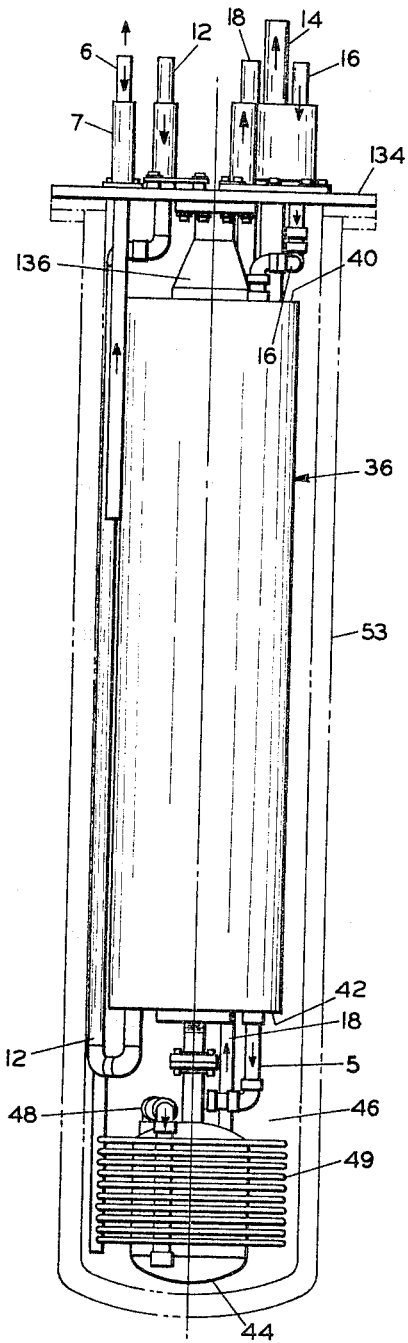
FIG. 6 is a front view, partially in section, of a warmer Dewar and warmer heat exchanger comprising a portion of the apparatus of the preceding figures.
Figure 7:
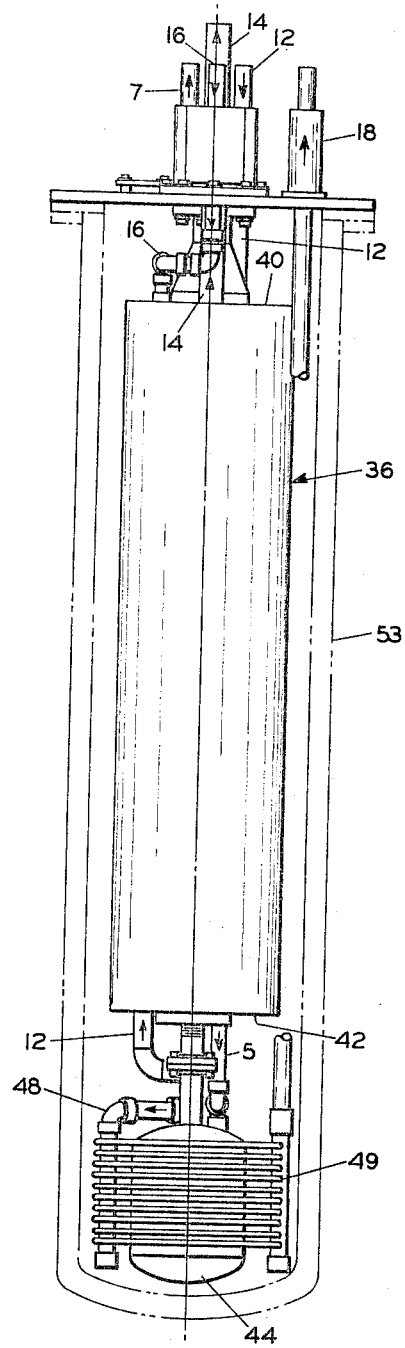
FIG. 7 is a side view, partially in section, of a warmer Dewar and warmer heat exchanger comprising a portion of the apparatus of the preceding figures.

Reference is next made to FIGS. 6 and 7 which illustrate the actual internal structure of the warmer Dewar 53. Here it will be seen that warmer heat exchanger 36 is suspended from a lid 134 of the Dewar at the suspension member 136 with the top of the exchanger being the warmer end at 40 and the bottom of the exchanger being the colder end at 42.

It will further be seen from FIGS. 6 and 7 that the liquid nitrogen heat exchanger 49, which is in the form of coiled tubing, and the previously described purifier 44 are disposed in the bath 46 of liquid nitrogen.

Since the flow of the gaseous helium through warmer heat exchanger 36 was previously described in detail herein in connection with the description of FIG. 1, it need not again be repeated and it is suffice to say that the conduits in FIGS. 6 and 7 which correspond with conduits in FIG. 1 are designated by identical numerals.

Figure 9:
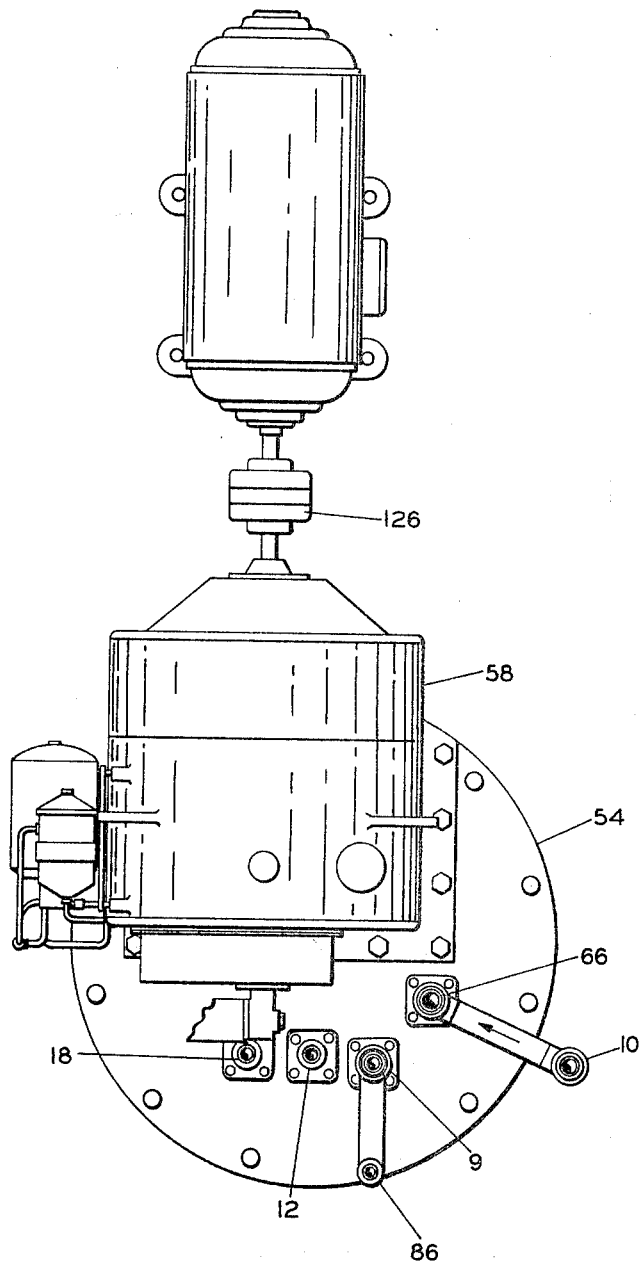
FIG. 9 is a top elevational view of the colder Dewar and heat exchanger assembly of FIG. 8.

Reference is next made to FIGS. 8 and 9 which illustrate the interior structure of Dewar 55. Here it will be seen that colder heat exchanger 54 is suspended from a lid 140 of the Dewar at a suspension member 142 with the warmer end of exchanger 54 being at the top as seen at 50 and the colder end of the exchanger being at the bottom as seen at 56.

Here again in FIGS. 8 and 9, the conduits that correspond to the conduits in FIG. 1 are designated by identical numerals and the description thereof will not again be repeated.

It should be pointed out that FIG. 8, being the actual structure, illustrates several elements that do not appear in the diagrammatic view. For example, a filter 150 is located in conduit 3 that delivers gas to the inlet of the expansion engine. Another surge tank 154 is located in the bottom of the Dewar and discharges into the previously mentioned conduit 9 that delivers gas from the exhaust of expansion engine 58 to the load 62.

It should further be pointed out that a conduit portion 156 leads into a junction with line 10 and a bayonet type heating element, not illustrated, for the previously mentioned temperature controller heater 68, FIG. 1, is extended into conduit portion 156.

While the forms of embodiments of the present invention as herein disclosed constitute preferred forms, it is to be understood that other forms might be adopted, all coming within the scope of the claims which follow:

I claim:
1. A helium refrigerator comprising, in combination, a load to be refrigerated; frame means; an insulated Dewar mounted on said frame means and including a liquid phase of a cryogenic gas in the lower portion thereof and a gaseous phase of said cryogenic gas above said liquid phase; a purifier within said Dewar and immersed in said liquid phase of said cryogenic gas; a warmer heat exchanger mounted in the upper portion of said Dewar and within said gaseous phase of said cryogenic gas; a second Dewar mounted on said frame means adjacent said first Dewar and containing an environment of gaseous helium; a colder heat exchanger mounted in said second Dewar and within said gaseous helium environment; an expansion engine mounted outside said second Dewar and including an inlet extending into said second Dewar and communicating with an outlet of said colder heat exchanger; a helium gas supply tank mounted on said frame means adjacent said Dewars; a helium compressor; helium delivery conduit means leading from helium gas supply through said compressor, warmer heat exchanger, purifier, colder heat exchanger and expansion engine to said load; and refrigerated helium return conduit means leading from said load through said colder heat exchanger and warmer heat exchanger back to the inlet of said compressor.

2. A helium refrigerator comprising, in combination, a load to be refrigerated; frame means; a first Dewar mounted on said frame means and including a liquid phase of a cryogenic gas in the lower portion thereof and a gaseous phase of said cryogenic gas above said liquid phase; a purifier within said first Dewar and immersed in said liquid phase of said cryogenic gas; a warmer heat exchanger mounted in the upper portion of said first Dewar and within said gaseous phase of said cryogenic gas; a second Dewar mounted on said frame means adjacent said first Dewar and containing an environment of gaseous helium; a colder heat exchanger mounted in said second Dewar and within said gaseous helium environment; an expansion engine mounted outside said second Dewar and including an inlet extending into said second Dewar and communicating with an outlet of said colder heat exchanger; a helium gas supply tank mounted on said frame means adjacent said Dewars; a helium compressor; helium delivery conduit means leading from helium gas supply through said compressor, warmer heat exchanger, purifier, colder heat exchanger and expansion engine to said load; refrigerated helium return conduit means leading from said load through said colder heat exchanger and warmer heat exchanger back to the inlet of said compressor; and a second heat exchanger and immersed in said liquid phase of said cryogenic gas in said first Dewar.

3. A helium refrigerator comprising, in combination, a load to be refrigerated; frame means; an insulated Dewar mounted on said frame means and including a liquid phase of a cryogenic gas in the lower portion thereof and a gaseous phase of said cryogenic gas above said liquid phase; a purifier within said Dewar and immersed in said liquid phase of said cryogenic gas; a warmer heat exchanger mounted in said upper portion of said Dewar and within said gaseous phase of said cryogenic gas; a second Dewar mounted on said frame means adjacent said first Dewar and containing an environment of gaseous helium; a colder heat exchanger mounted in said second Dewar and within said gaseous helium environment; an expansion engine mounted on said second Dewar and including an inlet communicating with an outlet of said colder heat exchanger; a helium gas supply tank mounted on said frame means adjacent said Dewars; a helium compressor; refrigerated helium delivery conduit means leading from helium gas supply through said compressor, warmer heat exchanger, purifier, colder heat exchanger and expansion engine to said load; refrigerated helium return conduit means leading from said load through said colder heat exchanger and warmer heat exchanger back to the inlet of said compressor; a graphic control panel forming the front wall of said frame means and diagrammatically illustrating the above mentioned components connected together in cyclical relationship; and a plurality of gauges on said frame means showing conditions at various locations in said cyclical relationship of components on said graphic control panel.

4. A helium refrigerator comprising, in combination, a load to be refrigerated; frame means; an insulated Dewar mounted on said frame means and including a liquid phase of a cryogenic gas in the lower portion thereof and a gaseous phase of said cryogenic gas above said liquid phase; a purifier within said Dewar and immersed in said liquid phase of said cryogenic gas; a warmer heat exchanger mounted in said upper portion of said Dewar and within said gaseous phase of said cryogenic gas; a second Dewar mounted on said frame means adjacent said first Dewar and containing an environment of gaseous helium; a colder heat exchanger mounted in said second Dewar and within said gaseous helium environment; an expansion engine mounted on said second Dewar and including an inlet communicating with an outlet of said colder heat exchanger; a helium gas supply tank mounted on said frame means adjacent said Dewars; a helium compressor; refrigerated helium delivery conduit means leading from helium gas supply through said compressor, warmer heat exchanger, purifier, colder heat exchanger and expansion engine to said load; refrigerated helium return conduit means leading from said load through said colder heat exchanger and warmer heat exchanger back to the inlet of said compressor; a second heat exchanger and immersed in said liquid phase of said cryogenic gas in said first Dewar; a graphic control panel forming the front wall of said frame means and diagrammatically illustrating the above mentioned components together in cyclical relationship; and a plurality of gauges on said frame means showing conditions at various locations in said cyclical relationship of components on said graphic control panel.

5. The helium refrigerator defined in claim 1 wherein said cryogenic gas in said first Dewar is nitrogen.

6. The helium refrigerator defined in claim 2 wherein said cryogenic gas in said first Dewar is nitrogen.

7. The helium refrigerator defined in claim 3 wherein said cryogenic gas in said first Dewar is nitrogen.

8. The helium refrigerator defined in claim 4 wherein said cryogenic gas in said first Dewar is nitrogen.

9. A helium refrigerator, a load to be refrigerated; comprising in combination, frame means; a first vertically disposed Dewar mounted on said frame means, lid means on the top of said first Dewar; a second vertically disposed Dewar mounted on said frame means; lid means on said second Dewar; a warmer heat exchanger vertically disposed in said first Dewar and including a warmer upper end and a colder lower end; a colder heat exchanger vertically disposed in said second Dewar and including a warmer upper end and a colder lower end; a bath of a liquified cryogenic gas in the bottom of said first Dewar; a stratified cryogenic gas in said second Dewar; a third heat exchanger between said warmer and colder heat exchangers and disposed in said bath in heat exchange relationship therewith; conduit means leading from a supply of gaseous helium to said warmer heat exchanger; conduit means leading from said colder heat exchanger to said load to be refrigerated; and conduit means leading from said load back through said colder and warmer heat exchangers.

10. The refrigerator defined in claim 9 that includes a purifier downstream of said warmer heat exchanger and disposed in said bath of liquified cryogenic gas.

11. The refrigerator defined in claim 9 that includes an expansion engine downstream of said colder heat exchanger, said expansion engine being extended into said second Dewar.

12. The refrigerator defined in claim 9 that includes a purifier downstream of said warmer heat exchanger and disposed in said bath of liquified cryogenic gas; and an expansion engine downstream of said colder heat exchanger, said expansion engine being extended into said second Dewar.

13. The refrigerator defined in claim 9 that includes a cooled down by-pass valve disposed in a conduit leading from the downstream end of said first mentioned conduit to said load.

14. The refrigerator defined in claim 9 wherein certain of said heat exchangers are suspended from their respective lids.

References Cited by the Examiner
UNITED STATES PATENTS

| | | | |
|---|---|---|---|
| 2,737,032 | 3/1956 | Latham | 62—513 X |
| 2,927,437 | 3/1960 | Rae | 62—53 |
| 2,967,961 | 1/1961 | Heil | 62—514 X |
| 3,118,751 | 1/1964 | Seidel | 62—88 X |
| 3,125,863 | 3/1964 | Hood | 62—77 X |
| 3,195,322 | 7/1965 | London | 62—467 |
| 3,195,620 | 7/1965 | Steinhardt | 165—2 |

ROBERT A. O'LEARY, *Primary Examiner.*

W. E. WAYNER, *Assistant Examiner.*

MEYER PERLIN, *Examiner.*